United States Patent [19]

Brusen

[11] Patent Number: 4,531,235
[45] Date of Patent: Jul. 23, 1985

[54] DIVERSITY SIGNAL STRENGTH INDICATOR AND SITE SELECTION APPARATUS FOR USING SAME

[75] Inventor: Karl R. Brusen, Fox River Grove, Ill.

[73] Assignee: Motorola, Inc., Schaumburg, Ill.

[21] Appl. No.: 505,626

[22] Filed: Jun. 20, 1983

[51] Int. Cl.³ .................... H04B 1/16; G01R 19/04
[52] U.S. Cl. ................................ 455/273; 455/134; 455/137; 455/226; 455/33
[58] Field of Search ............... 455/33, 52, 65, 137, 455/138, 226, 273, 278, 134, 136, 277; 375/40, 100; 307/351; 328/151

[56] References Cited

U.S. PATENT DOCUMENTS

| | | | |
|---|---|---|---|
| 3,828,260 | 8/1974 | Underwood | 307/351 |
| 3,869,624 | 3/1975 | Fletcher et al. | 307/351 |
| 3,902,119 | 8/1975 | Skingley | 455/138 |
| 3,916,316 | 10/1975 | Hearn et al. | 455/134 |
| 3,947,769 | 3/1976 | Rousos et al. | 375/100 |
| 4,028,627 | 6/1977 | Cho et al. | 455/136 |
| 4,034,299 | 7/1977 | Cho et al. | 455/226 |
| 4,400,633 | 8/1983 | Mouri | 307/351 |

*Primary Examiner*—Jin F. Ng
*Attorney, Agent, or Firm*—Donald B. Southard; Edward M. Roney; James W. Gillman

[57] ABSTRACT

A diversity signal strength indicator for transmission site selection in a cellular-like mobile radio system produces an output strength indication signal which is proportional to the logarithm of the average strength of two diversity input signals. The two input diversity signals are time multiplexed together to form a composite signal, and a log amplifier/envelope detector then produces an intermediate log signal which is proportional to the logarithm of the envelope of the composite signal. The intermediate log signal is then operated on by a peak detector to produce a peak intermediate log signal which is then passed through a low pass filter to produce an output strength detection signal proportional to the average of the intermediate log signal and thus proportional to the logarithm of the average strength of the diversity input signal. The peak detector is preferably comprised of a capacitor charged through a diode for storing the peak levels of the intermediate log signal and a current source for draining the charge on the capacitor at a substantially uniform rate which is independent of the magnitude of the peak signal which is stored during time periods between peak signals. In another embodiment, the time multiplexed composite signal is first detected and then passed through a squaring circuit, a low pass filter and then a log amplifier to produce an output indicator circuit proportional to the logarithm of the average strength of the input diversity signals. The diversity signal strength indicator is employed in combination with a site selection system for selecting suitable ones of a plurality of transceiver sites for actuation and reception of signals to be transmitted to a remote portable unit.

29 Claims, 16 Drawing Figures

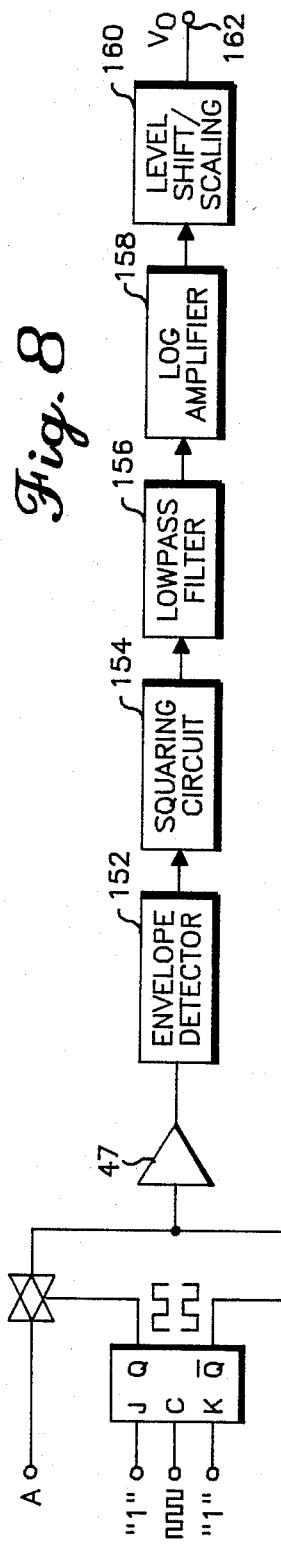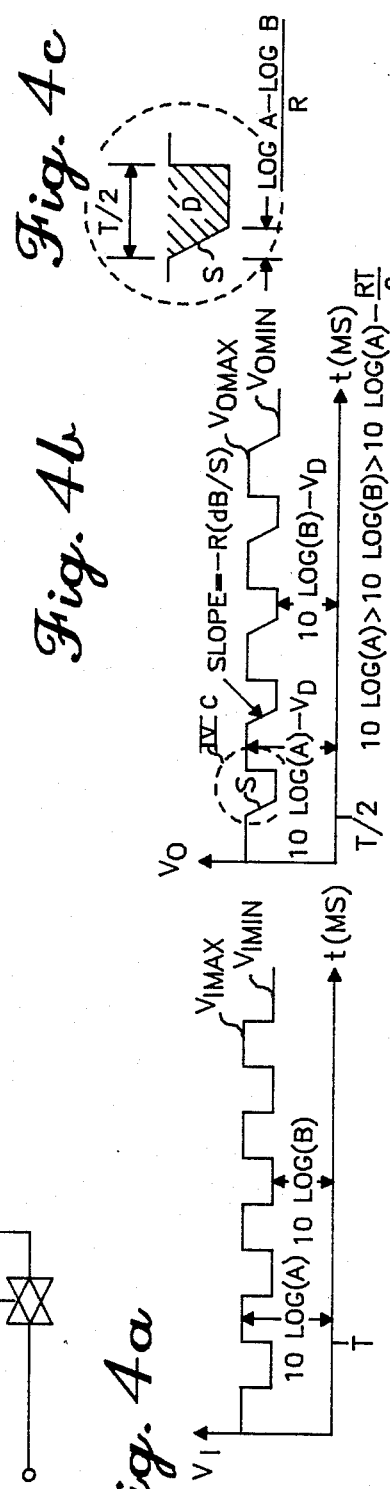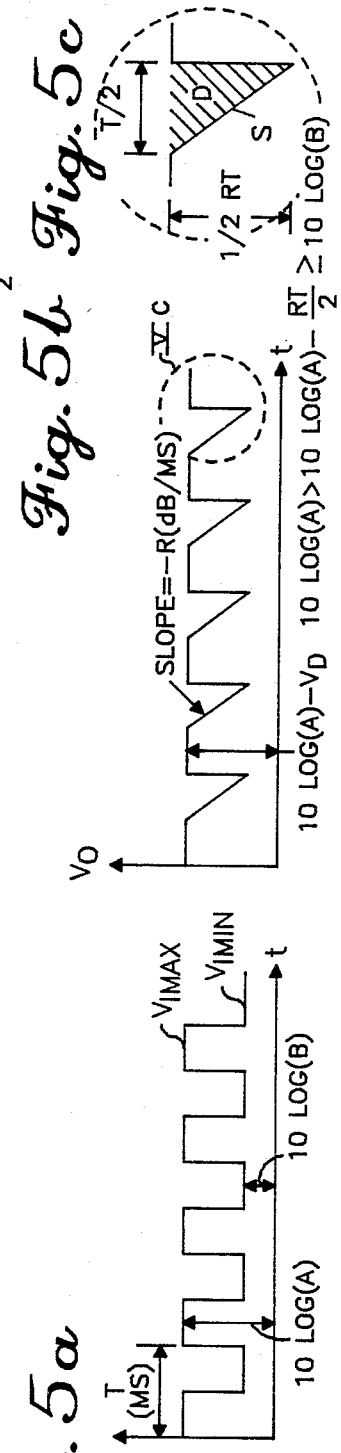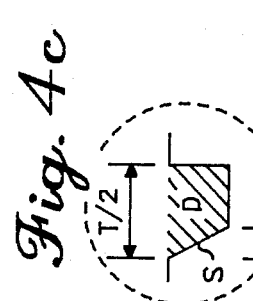

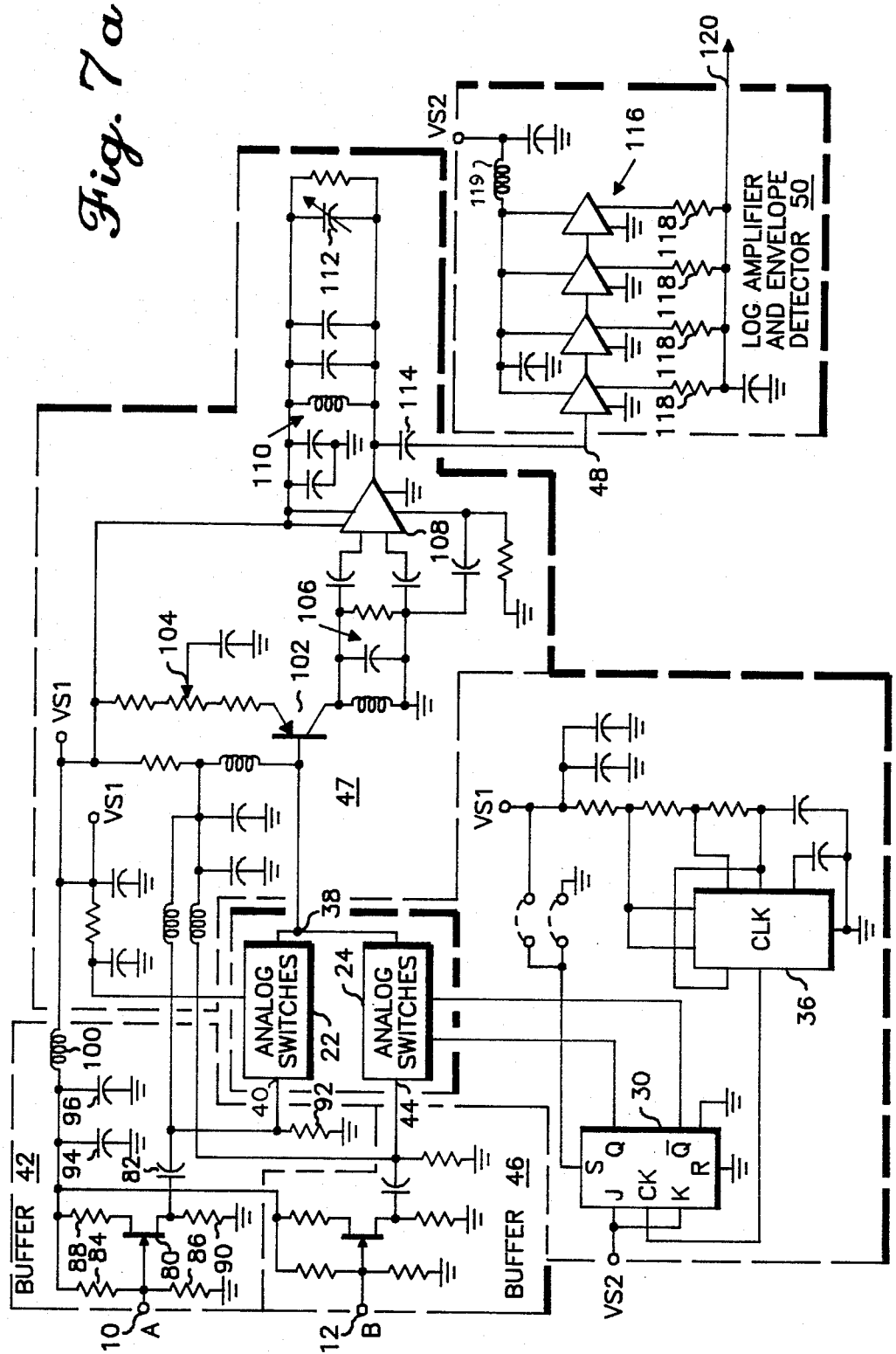

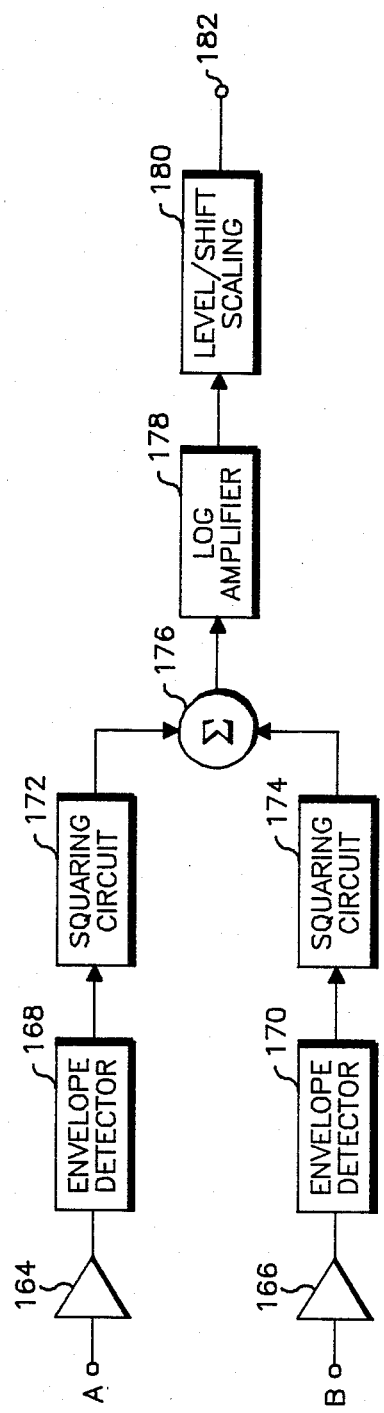

4,531,235

DIVERSITY SIGNAL STRENGTH INDICATOR AND SITE SELECTION APPARATUS FOR USING SAME

BACKGROUND OF THE INVENTION

This invention relates to signal strength indicators generally and, more particularly, to a diversity signal strength indicator particularly useable in diversity type radio reception systems for purposes of cellular site selection and the like.

Signal strength indicators have been used in mobile cellular communication systems and the like to determine the strength of incoming signals from mobile transceiver units. In such systems, the signal from a given mobile unit at those sites which are closest to the mobile unit are the strongest signals, and those further away are the weakest signals. A computer compares the relative strengths of the signals at the different sites and thereby determines the relative location of the mobile unit within the cellular system. Once the location is determined, the site or sites closest to the mobile unit are selected by the computer for receipt of messages from the base station and transmission of these messages back to the mobile unit. In this way, messages may be sent at the same frequency to different mobile units at the same time, so long as the mobile units are located at cells sufficiently spaced from one another to prevent crosstalk.

A difficulty encountered with such systems, particularly when operating in the ultra high frequency range, is caused by random signal cancellation. This signal cancellation results because of multiple signal paths which are created and destroyed in random fashion as the portable transmitter is moved. The effect of this cancellation is commonly known as "Rayleigh fading".

The problem of Rayleigh fading has been partly overcome through use of diversity reception and detection in which the incoming signals from the remote transceiver are received at two separate and spaced antennas at each site, or cell. There are several types of such diversity reception systems: maximal ratio combining diversity, equal gain combining diversity, switch diversity and selection diversity.

In the maximal ratio combining diversity system, the two incoming diversity signals at the two spaced antennas are first squared. They are then put in phase with one another, or co-phased, through a regenerative feedback circuit or the like. The two co-phased signals are then summed, or averaged, to produce an output signal proportional to the power of the incoming signals.

Equal gain combining diversity systems operate substantially the same as the maximal ratio systems described above, except that the incoming signals are not first squared. Accordingly, the output signal is proportional to the voltage of the incoming diversity signals and not to the power as in maximal ratio combining diversity systems.

The outputs from these two combiner types of diversity systems are generally applied to an FM demodulator or other similar circuit to obtain or derive the informational content from the composite signal produced by the diversity system. When such combining diversity systems are employed in a cellular-like communication system, a signal strength indicator needed for transmission site selection purposes could be operated from the composite output signal of the combiner circuitry. In such event, in a maximal ratio system, site selection would be based on only the square of the voltage of the diversity input signal at the antenna which is proportional to the power of the signal. In the equal gain diversity systems, on the other hand, site selection would be based on only the magnitude of the voltage of the diversity input signal at the antenna and not based on the power of the signal. This approach limits versatility and introduces inaccuracy for purposes of site selection.

Another disadvantage of using the combining signal as the input to a signal strength indicator in combining type diversity systems results simply because of the fact that the greater the amount of circuit operations performed on the received diversity input signal at the antennas before these signals are applied to the input of any site selection signal strength indicator, the greater the chance that such circuitry will introduce error. That is, the combining circuitry can introduce fluctuations in the input signal to the site selection signal indicator which are unrelated to fluctuation in true signal strength at the antenna. For instance, the co-phasing circuitry used in both maximal ratio and equal gain combining diversity systems often have nonlinear regions of operation.

Since the information of the signals is contained in their frequency modulation in FM systems, these errors in signal amplitude are not necessarily critical with respect to obtaining necessary minimal signal to noise ratios and for purposes of deriving the informational content of the frequency modulated signals. However, for purposes of determining signal strength to enable accurate transmission site selection, such amplitude errors are more troublesome.

Known techniques for transmission site selection in switch diversity and selection diversity reception systems also suffer from certain disadvantages. This is partly because the input to the signal strength indicators is taken from only one antenna at a time and is therefore subject to Rayleigh effects.

In switch diversity systems, the signal at only one of the plurality of antennas is monitored by a signal strength indicator of the type which produces a signal proportional to the logarithm of the incoming signal. If the signal strength indicator indicates a strength below a preselected minimum threshold level, the scan circuitry switches to another antenna until one is found having an associated signal strength which exceeds the minimum threshold level. Thus, the signal strength indicator receives an input signal from only one antenna at a time. Accordingly, the output of this signal strength indicator is sensitive to Rayleigh effects and therefore does not necessarily provide an accurate representation of the average strength of the signal received at the site. In switch selection diversity systems, a separate signal strength indicator for transmission site selection purposes could be fixedly connected to one of the plural antennas. However, such a signal strength indicator is also subject to Rayleigh effects.

In selection diversity systems, a separate conventional signal strength indicator is provided for each of a plurality of antennas at the site. The frequency demodulator or the like is switched to the antenna having the maximum signal strength as detected by scanning the plurality of signal strength indicators respectively associated with the plurality of antennas. If only a fixed one of these signal strength indicators is used as the source for transmission site selection, then it is, of course, subject to Rayleigh effects. If, on the other hand, the signal at the selected antenna having the signal of maximum strength is used as the signal for monitoring signal strength for site selection purposes, then again site selection will be subject to Rayleigh effects.

Another approach to signal strength measurement for site selection purposes in selection diversity systems could be to sum, or average, the outputs of two or more of the plural signal strength indicators. The conventional signal strength indicators produce an output signal which is proportional to the logarithm of the amplitude of the input signal. However, the sum of a plurality of logarithms of a plurality of numbers is not equal to the logarithm of the sum of the numbers. Accordingly, the output of such a summing, or averaging, circuit would also fail to provide an accurate representation of the average signal strength for site selection purposes.

Thus, it is seen that although diversity reception systems are known, the advantages of such systems have not been successfully employed in signal strength indicators generally or for purposes of site selection in cellular type radio networks even though multiple signals from multiple antennas have been available for such purpose in diversity type radio reception systems.

SUMMARY OF THE INVENTION

It is therefore an object of the present invention to provide a diversity signal strength indicator for purposes of providing amplitude signal strength indication for purposes of site selection in cellular-like mobile radio networks which minimize Rayleigh effects.

It is a further object to provide such a diversity signal strength indicator in which the output signal produced thereby is proportional to the average peak magnitude of the logarithm of the average of two input diversity signals.

Yet another object is to provide a site selection system for a mobile radio communication network comprising a plurality of diversity reception sites in which a diversity signal strength indicator is employed to optimize accurate selection of the appropriate site for transmissions to the mobile unit.

In one embodiment, these objectives are obtained by providing a diversity signal strength indicator comprising a pair of terminals for receipt of two separate input signals from two spaced antennas or the like, means for combining the two separate radio signals to produce a composite signal representative of the average of the two input diversity signals, means for producing an intermediate log signal which is proportional to the logarithm of the composite signal, means for detecting the peak magnitude of the intermediate log signals to produce a second intermediate signal, and means for developing an output DC voltage signal which is proportional to the average magnitude of the second intermediate signal and thus proportional to the logarithm of the average signal strength of the two diversity input signals.

Yet another object of the present invention is to provide a peak signal detector useable with the diversity signal strength indicator which more accurately follows the peak levels of the input signal. Unlike known peak or envelope detectors, the peak signal detector of the present invention is provided both with means for draining the energy in a storing means between peak levels of storage at a rate which is substantially independent of the peak amplitude of the stored energy. Preferably, the energy draining means dissipates the stored energy at a substantially uniform rate.

In a preferred embodiment, a capacitor is charged through one or more diodes from the input signal, and a constant current source discharges the capacitor at a substantially constant rate.

An advantageous feature of this arrangement results from the fact that the current through the diodes is constant during periods that the capacitor is fully charged. Accordingly, variations in voltage drop across the diodes caused by the resistance and junction voltage characteristics of the diodes are minimized. Another advantageous feature is that the output signal stored in the capacitor does not decrease at a relatively more rapid rate for large peak signals as compared to the rate for smaller peak signals as occurs when a resistive element, for instance, is used to discharge the capacitor between peak levels.

A further and more particular object of the present invention is the provision of a site selection system in a cellular-like mobile radio network employing a plurality of diversity radio receivers in which the advantages of diversity reception are obtained for purposes of site selection. In a preferred embodiment, the site selection system includes a signal strength indicator at each site having a pair of terminals, means for respectively coupling a pair of antennas at the site directly to the pair of terminals and means responsive to the diversity signals at said pair of terminals to produce a signal strength output signal which is proportional to the logarithm of the average strength of both input diversity signals in combination with means responsive to said signal strength output signal from each of said sites for activating the transmitters at selected sites.

Yet another object of the present invention is to provide alternate diversity signal strength indicators useable for site selection purposes. In one embodiment, the signal strength indicator comprises means for receiving a pair of diversity input signals, means for combining the pair of signals on a time multiplexing basis, means for producing an envelope detection signal proportional to the peak magnitude of the combined signal, means for producing a signal proportional to the average of the envelope detection signal and means for producing a log signal which is proportional to the logarithm of the envelope detection signal and thus to the logarithm of the average signal strength of the two input signals. Alternatively, the envelope detection signal is squared before being averaged. In another alternate embodiment, a diversity signal strength indicator is provided which comprises means for individually detecting the envelope of first and second input signals, means for summing said pair of detected signals and means responsive to said summing means for producing an output signal which is proportional to the logarithm of the sum of said pair of detected signals. Alternatively, the detection signals are squared before being summed, or averaged.

BRIEF DESCRIPTION OF THE DRAWINGS

The foregoing objects, features and advantages will be described in greater detail and further objects, features and advantages will be made apparent from the following detailed description of the preferred embodiments which is given with reference to the several views of the drawing, in which

FIG. 3b is an illustrative waveform of the output signal produced by the peak detector of FIGS. 1 and 2 in response to the input signal shown in FIG. 3a;

FIG. 4a is an illustrative waveform of the input signal applied to the peak detector of FIGS. 1 and 2 for the situation when the diversity input signals are of different magnitudes;

FIG. 4b is an illustrative waveform of the output VO of the peak detector produced in response to the input signal of FIG. 4a;

FIG. 4c is an enlargement of a portion of IV-C of the waveform of FIG. 4b;

FIG. 5a is another illustrative waveform of an input signal VI to the peak detector of FIGS. 1 and 2 produced in response to diversity input signals having a larger difference in magnitude than that previously shown in FIG. 4a;

FIG. 5b is an illustrative waveform of the output signal VO produced by the peak detector in response to the input signal of FIG. 5a;

FIG. 5c is an enlargement of a portion V-C of FIG. 5b;

FIG. 6a is an illustrative plot of the output signal produced by the diversity signal strength indicator of FIG. 1 on a log log coordinate system which results when one of two input diversity signals is held at a level of 0 db while the other is varied from 0 db to a relative level comparable to that shown in FIG. 5a;

FIG. 6b is a representative plot of the error characteristic of the diversity signal strength indicator of FIG. 1 for input changes corresponding to those illustrated in FIG. 6a;

FIGS. 7a and 7b form a composite circuit schematic of a preferred circuit for implementation of the functional block diagram of the diversity signal strength indicator circuit of FIG. 1;

FIG. 8 is a functional block diagram of an alternate embodiment of the diversity signal strength indicator of the present invention; and FIG. 9 is a functional block diagram of yet another alternate embodiment of the diversity signal strength indicator circuit of the present invention.

DETAILED DESCRIPTION

Figure 1:
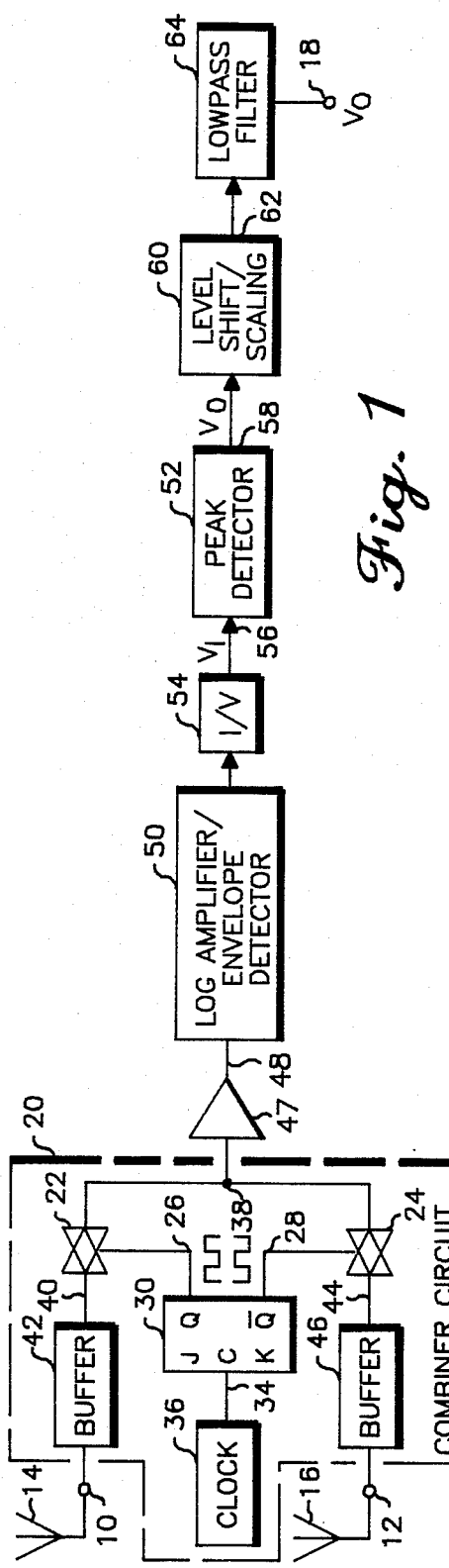
FIG. 1 is a functional block diagram of a preferred embodiment of the diversity signal strength indicator circuit of the present invention.

Referring to FIG. 1, a functional block diagram of a preferred embodiment of the present invention, is shown. The circuit includes a pair of input terminals 10 and 12 for respective connection with a pair of antennas 14 and 16. While the input terminals 10 and 12 are illustrated as being directly connected to the antennas 14 and 16, for purposes of simplicity, it should be appreciated that intervening amplifiers and mixers are required to convert the antenna signals to a suitable form and level for subsequent operations. Preferably, these are the same antennas which are being used by a diversity radio reception system at a particular site. However, the diversity signal strength indicator circuit could also function with its own antennas apart from the antennas used by the signal reception system.

It should be understood that the incoming diversity signals are emanating from a single source, and the informational content of these signals is derived by applying them to an FM demodulator or the like which operates from the output signal of one of the diversity reception systems described above. Since most of the information is contained in the frequency or phase of these signals, the amplitude is not critical for accurate derivation of the informational content. However, as noted above, for purposes of determining the location of a remote transmitter based upon the strength of the incoming signal at different site locations, the amplitude is critical. The diversity signal strength indicator thus produces an indication signal on an output 18 which no longer has the phase or frequency information of the diversity input signal but which does contain more accurate information with respect to the strength, or amplitude of the diversity input signals.

The input terminals 10 and 12 comprise a pair of separate inputs to a combiner circuit 20. Combiner circuit 20 combines these two signals together to produce a composite signal representative of the average of the two diversity input signals. This composite signal is then operated on by subsequent circuitry to produce the signal strength indicator signal on output 18.

The combiner circuit includes a pair of analogue switches 22 and 24 respectively controlled by square wave switching signals produced on the normal output 26 and the inverting output 28 of a JK flip-flop 30. The JK flip-flop, in turn, has a clock input 34 which is driven by a free running oscillator, or clock, 36. The frequency of operation of clock 36 is selected to be sufficiently high relative to the Rayleigh fade frequency of the diversity reception signal to obtain the desired result as described in more detail below. A frequency of 250 Hz has been found suitable for diversity reception signals for land based mobile systems.

The analogue switches 22 and 24 are operated to alternately pass the diversity reception signals at input terminals 10 and 12 to a junction at the output 38 of the combiner circuit 20. An input 40 of analogue switch 22 is coupled through a suitable buffer 42 to the diversity input signal at input terminal 10. Likewise, an input 44 of analogue switch 24 is coupled through a buffer 46 to the diversity input signals at input terminal 12. When a one-state signal on normal output 26 is applied to the control input of analogue switch 22, analogue switch 22 assumes a conductive state to pass the buffered diversity input signal from antenna 14 to the combiner circuit output 38. When the normal output 26 is in a zero state, the analogue switch 22 turns off. Since the normal and the inverting outputs of flip-flop 30 are 180° out of phase with respect to one another, a one-state signal on inverting output 28 causes analogue switch 24 to turn on at the same time switch 22 turns off and vice versa. This results in the application of the buffered diversity input signal at antenna 16 being passed through the analogue switch 24 to combiner circuit output 38. Thus, the composite signal produced at output 38 is a time multiplexed signal with samples of the pair of diversity input signals being provided during alternate time segments.

The composite signal is then amplified to a suitable level by a two-stage amplifier 47 and applied to the input 48 of a combined log amplifier/envelope detector circuit 50. The log amplifier/envelope detector circuit 50 produces an intermediate log signal having an amplitude which is proportional to the logarithm of the envelope of the composite signal. While a combined log amplifier/envelope detector circuit is preferred for this function, it should be appreciated that a separate envelope detector circuit followed by a separate log amplifier circuit could be employed in its place.

The intermediate log signal produced by the log amplifier/envelope detector circuit 50 in the preferred embodiment constitutes a current signal. In this instance, the following peak detector circuit 52 requires a voltage signal for an input. Accordingly, a current to voltage, or I/V converter, 54 is provided to convert the intermediate log current to a corresponding intermediate log voltage which is applied to an input 56 of peak detector 52. The peak detector 52 functions to detect the peak magnitude of the intermediate log signal at input 56 to produce a second intermediate, or peak detected log signal, on its output 58. The peak detected log signal at output 58 is proportional to the peak magnitude of the intermediate log signal. In a preferred embodiment, the peak detector 52 comprises a uniform droop peak detector shown in FIG. 2 and described below. In describing the operation of this peak detector circuit 52, the signal applied to input 56 is designated as VI and the signal at output 58 is designated as VO.

The signal VO at output 58 is applied to a level shifting/scaling circuit 60 which produces a proportional signal on its output 62. This level shifted signal is then applied to an integrator, or averaging circuit, such as a low pass filter, to develop a corresponding DC voltage signal which is proportional to the average magnitude of the peak detected intermediate log signal VO. The output of this averaging means, or low pass filter, 64 is then applied to output terminal 18 at which the signal strength indicator output signal is provided. It should be appreciated that level shifting could be performed after the low pass filter stage instead of before.

Figure 2:
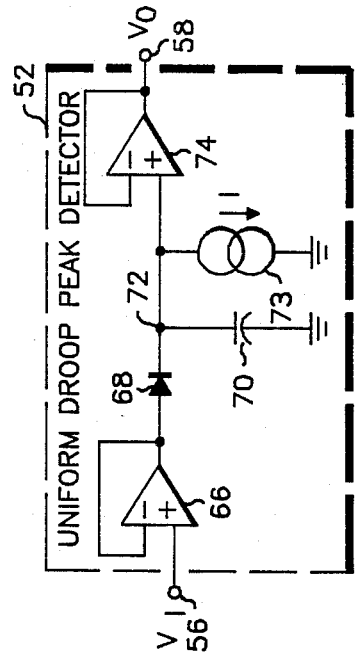
FIG. 2 is a schematic circuit diagram of a preferred embodiment of the peak detector functional block of FIG. 1.

Referring now to FIG. 2, a preferred embodiment of the peak detector functional block 52 is shown in circuit schematic form which is referred to herein as the uniform droop peak detector, or peak detector. The input signal VI at input terminal 56 is applied to an isolation amplifier 66. The output of amplifier 66 is applied through a diode 68 to charge a capacitor 70 which is coupled between the cathode of diode 68 and a reference potential, such as ground. The junction 72 between diode 68 and capacitor 70 is coupled to the input of another isolation amplifier 74, the output of which is coupled to output terminal 58. The isolation amplifiers 66 and 74 have a high input impedance to prevent undue loading of the circuitry connected to their respective inputs.

In conventional peak detectors, a resistor is generally connected in parallel with the capacitor 70 between junction 72 and the reference potential to which the capacitor 70 is connected to discharge the capacitor 70 during the time intervals between peak signals. The charge on capacitor 70, and thus the output voltage VO, droops at an exponential rate determined by the respective values of the resistor and capacitor 70 and, more importantly, determined by the magnitude of the voltage at junction 72 relative to the reference potential. As will be explained in greater detail, this introduces error into the output signal VO. In the present invention, on the other hand, a constant current source, or current sink is connected in parallel with capacitor 70 between junction 72 and the common reference potential, or ground. As a result, as will be explained in greater detail, the signal stored in capacitor 70 is dissipated or drained at a constant rate which is independent of the magnitude of the input signal VI.

A particularly advantageous feature of the uniform droop peak detector results from the fact that since the diode 68 is driven by a constant current when capacitor 70 is fully charged, the drop across the diode remains substantially constant regardless of the signal level at junction 72. The drop across the diode increases with decreases in temperature. Normally, the fluctuations in voltage drop across the diode caused by fluctuations in signal strength detract from use of multiple diodes for temperature compensation purposes. However, since in the peak detector circuit 52 the diode current is substantially constant, the fluctuations in diode drop due to signal level do not appear. Multiple diodes 68 can therefore be better used to compensate for thermal sensitivity of other circuitry.

It should be appreciated that although a capacitor is employed for storing energy from the fluctuating input signal VI during peak levels thereof and the current source 73 is used for draining the energy stored in the capacitor between peak levels at a rate which is substantially independent of the peak amplitude of the stored energy, an analogous circuit employing an inductor and constant voltage source is contemplated. However, the capacitor and current source embodiment shown in FIG. 2 is preferred.

For purposes of analyzing the operation of the uniform droop peak detector 52, three distinct cases are described and illustrated in FIGS. 3a–3b, FIGS. 4a–4c, and FIGS. 5a–5c, respectively. In each of these cases, it is assumed A and B are relatively constant compared to the period of commutation T. For sake of simplicity, the constant characteristics of the log amplifier/envelope detector 50, slope C1 and offset C2, are assumed to have the values 10 and 0 respectively. This assumption is made solely for purposes of illustration and with this assumption the voltage levels are expressed in units of db and the droop rate R is expressed in units of db per milliseconds.

Figure 3A:
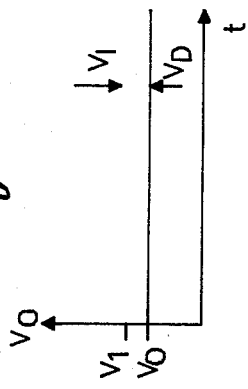
FIG. 3a is an illustrative waveform of the input provided to the peak detector of FIGS. 1 and 2 when the diversity input signal magnitudes are substantially equal.
Figure 3B:

When the two diversity input signals A and B are equal, the input signal VI to the uniform peak detector 52 is substantially constant as shown in FIG. 3a. Accordingly, as shown in FIG. 3b, the output signal VO is also substantially constant at a level equal to the input voltage VI less the drop VD across diode 68.

Referring to FIGS. 4a–4c, when the diversity input signals A and B have different amplitudes, the output signal VO alternates between two DC levels. As seen in FIG. 4a, the input signal VI fluctuates between a DC level $VI_{max}$ proportional to the log of the largest diversity input signal, such as signal A, and a lower DC level, $VI_{min}$ proportional to the log of the other diversity input signal B. As seen in FIG. 4b, the output signal VO varies from between two corresponding DC levels $VO_{max}$ and $VO_{min}$ which are equal to $VI_{max}$ and $VI_{min}$, respectively, less the voltage drop across diode 68, voltage VD. At the end of a period of $VI_{max}$, such as at time T/2, the capacitor is uniformly discharged by current sink 73. Accordingly, the output VO linearly decreases as shown by sloping segment S, as best seen in FIG. 4c. This slope R is defined by the equation R=I/C, where I equals the current of the current source and C equals the value of the capacitor. For the case shown in FIGS. 4a–4c, where 10 log (A) > 10 log (B) > 10 log (A) − RT/2, the output wave form VO has a notch of area D. The area of D is quadratically related to the AC component of the input signal VI, i.e., to 10 log (A) − 10 log (B). Since this notch occurs every period, the DC component of VO, $VO_{DC}$, becomes $$VO_{DC} = 10 \log (A) - V_D - \frac{D}{T} = 10 \log (A) - V_D -$$

$$\frac{1}{2}\left( 10 \log (A) - 10 \log (B) - \frac{[10 \log (A) - 10 \log (B)]}{RT} \right)$$

The constant term VD, may be ignored because it is eliminated by subsequent level shifting circuitry 60.

Referring now to FIGS. 5a–5c, it is illustrated that in the third case when 10 log (B) is less than 10 log (A)−(RT/2), the notch becomes independent of the AC componennt, or peak magnitude of VI. The DC component of VO is then expressed by the equation $$VO_{DC} = 10\log(A) - V_D - \frac{D}{T} = 10\log(A) - V_D - \frac{RT}{8}.$$

Again, the constant term, VD, may be ignored.

A comparison of the ideal or desired output signal VO to the theoretical output VO obtainable with the detector of FIG. 2 illustrates the advantages of the peak detector 52 of the present invention. VO' is represented by the equation $$VO' = 10 \log (A) + 10 \log \left( \frac{1 + 10\,[\log (B) - \log (A)]}{2} \right).$$

The DC component of VO is represented by the equation $$VO_{DC} = 10 \log (A) - \tfrac{1}{2} [10 \log (A) - 10 \log (B)] -$$

$$\frac{[10 \log (A) - 10 \log (B)]}{RT} \text{ for }$$

$$10 \log (A) > 10 \log (B) > 10 \log (A) - \frac{RT}{2}.$$

This reduces to $VO_{DC} = 10 \log (A) - (RT/8)$ for the condition $10 \log (A) - (RT/2) \geq 10 \log (B)$.

If A is held constant at 0 bd, then the equations are simplified:

$$VO' = 10 \log \left[ \frac{1 + 10\,(\log B)}{2} \right] \text{ and }$$

$$VO = \tfrac{1}{2}\left( 10 \log (B) + \frac{10 \log (B)^2}{RT} \right) \text{ for }$$

$$10 \log (A) > 10 \log (B) > 10 \log (A) - \frac{RT}{2}.$$

For the condition 10 log (A)−(RT/2)≧10 log (B), VO then reduces to the equation VO=−(RT/8).

Figure 6A:
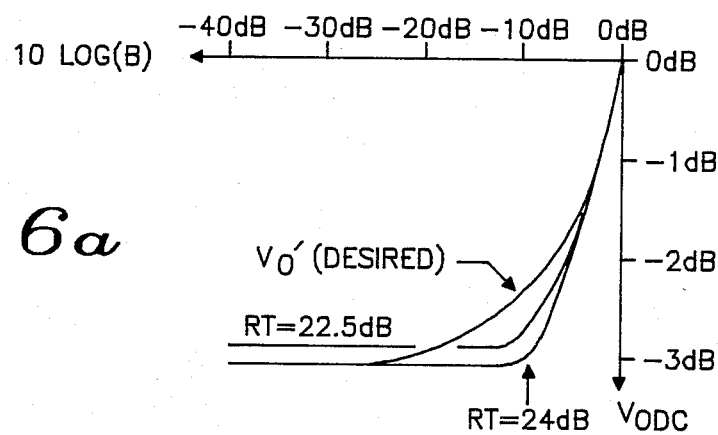

The above equations for VO' and VO have been plotted and are shown in FIG. 6a for two cases: RT=24 db and RT=22.5 db. The error, or difference between VO' and $VO_{DC}$ for the two cases illustrated in FIG. 6a, have been plotted and are illustrated in FIG. 6b.

Figure 6B:
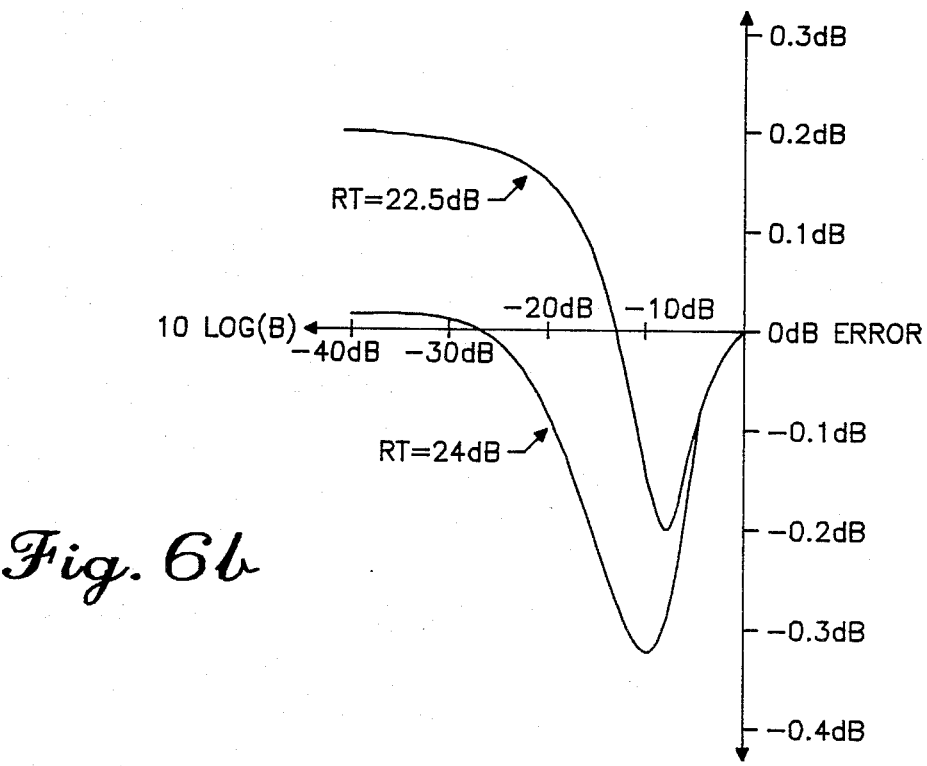

Although the curves shown in FIGS. 6a and 6b are for the special case in which 10 log (A)=0, the error curve of FIG. 6b, is nonetheless valid for all values of 10 log (A). This is because both the desired output VO' and the actual output VO can be expressed by the equation V=10 log (A)−log (B). Accordingly, when the error is calculated, the common term, 10 log (A), vanishes from the error calculation. The above analysis, of course, applies equally to cases where B is larger than A because of the symmetry of the circuit.

In practice, it is recommended to determine the proper value RT by experimentation. Effects due to slewing and finite bandwidth destort the waveform which introduces errors that complicate the analysis. The above analysis, however, illustrates that the averaging error of the uniform droop peak detector can be held to less than 0.3 db.

Figure 7B:
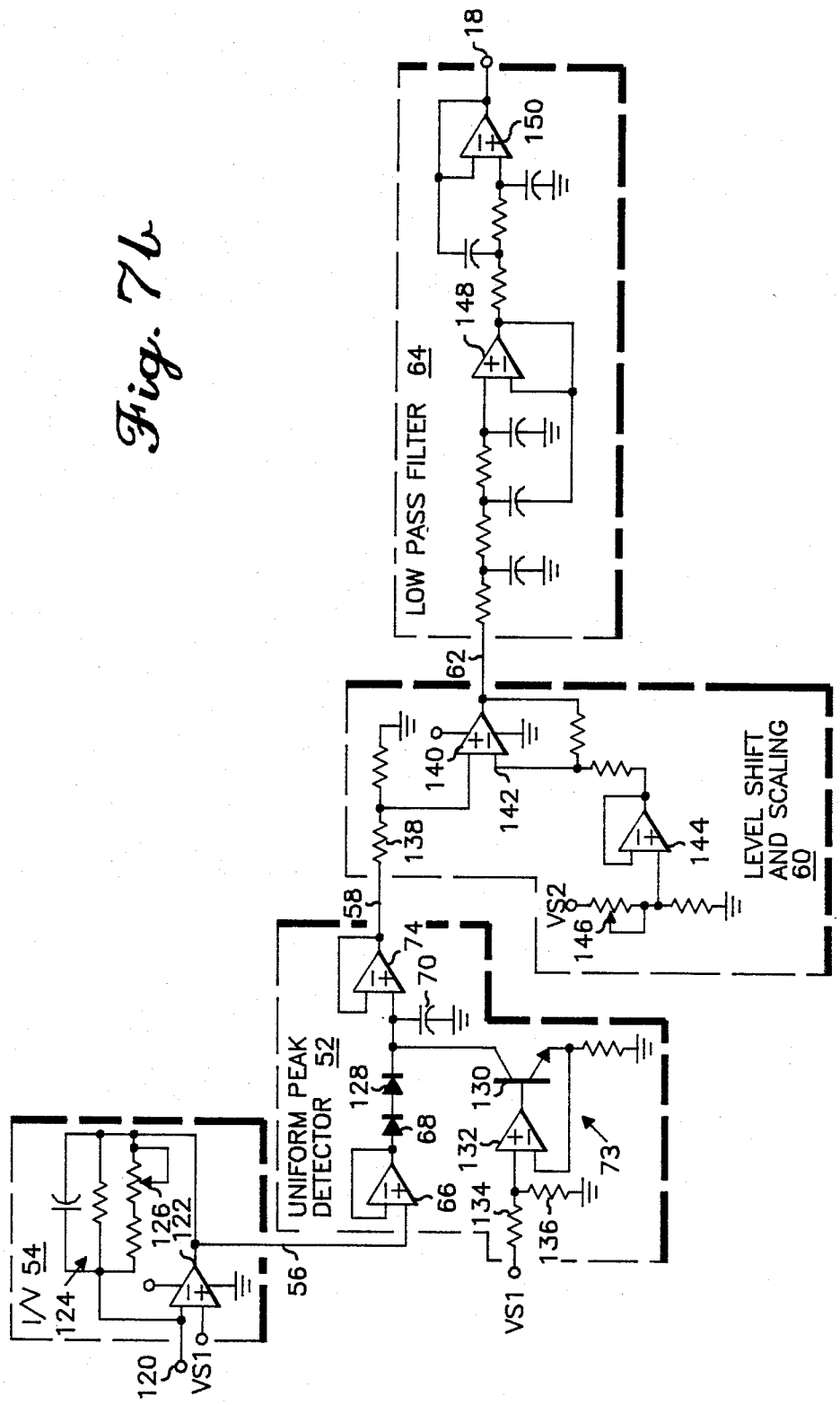

Referring now to FIGS. 7a and 7b, a circuit schematic of a preferred embodiment for implementation of the diversity signal strength indicator shown in block form in FIG. 1, will be described. As seen, each of the two buffers 42 and 46 are substantially identical. Accordingly, only one will be described. Each includes a field effect transistor 80 with its gate coupled to the associated input terminal 10 or 12 and its source terminal coupled through a capacitor 82 to the input terminal 40 or 44 of its associated analogue switch 22 or 24. Resistors 84 and 86 form a biasing voltage divider at the junction of terminal 10 and the gate of transistor 80. Resistors 88 and 90 also provide suitable bias. Another resistor 92 is coupled between capacitor 82 and ground. Each buffer is supplied with a suitable DC voltage VS1, such as 15 volts, through a filter formed by capacitors 94 and 96 and an inductor 100. The outputs of the analogue switches 22 and 24 are coupled together at junction 38 which, in turn, is coupled to the base of an PNP transistor 102 of amplifier 47. Gain calibration for amplifier 47 is provided by means of a potentiometer 104. The output of transistor 102 is applied through a filter network 106 to a suitable second stage amplifier 108, which has a filter network 110 including a variable capacitor 112. While other elements could be used in a preferred embodiment, amplifier 108 comprises an integrated IF amplifier; such as an MC 1350 or MC 1590 made by Motorola, Inc.

The output of the second stage amplifier 108 of amplifier circuit 47 is coupled through a capacitor 114 to input 48 of the combined log amplifier/envelope detector 50. The log amplifier/envelope detector 50 includes a plurality of cascaded limiting amplifier stages 116 powered by a second source of DC voltage VS2, such as 6 V DC, through an inductor 118. The outputs of the cascaded amplifiers 116 are coupled through a plurality of associated resistors 118 commonly connected to the output 120 of the log amplifier/envelope detector 50. The envelope detection function and log amplifier function are performed concurrently by this circuitry in a well known manner. Output 120 is coupled to the input of current to voltage converter 54 shown in FIG. 7b. In a preferred embodiment, the cascaded limiting amplifier stages are provided in an integrated circuit package such as SL 1613 integrated circuit made by Plessey Semiconductors. For a detailed description of the operation of log amplifier/envelope detector circuits of this type, reference may be made to Chapter 3, Section 6, pages 165–174, entitled "Low Cost Log IF Strip" of a book entitled RADAR & RADIO COMMUNICATIONS IC HANDBOOK, published June 1980 by Plessey Semiconductors.

The I/V converter 54 includes an operational amplifier 122 havings its inverting input coupled to output terminal 120 of the log amplifier envelope detector 50 and a negative feedback network 124 with a scaling potentiometer 126 for producing the conversion. The voltage developed at output 56 is coupled to the input of the uniform droop peak detector 52 which is substantially as shown in FIG. 2 and described above. However, as noted above, additional diodes, such as diode 128, may be added for thermal compensation purposes. The current source or sink 73 is provided by circuitry including a transistor 130 driven by an amplifier 132. Amplifier 132 is driven by a constant DC signal from power supply voltage VS1 through a voltage divider formed by resistors 134 and 136. By varying the magnitude of the current provided by the current source 73, such as by varying the value of resistor 134, the diversity signal strength indicator can be adapted to provide an output signal which is proportional to the logarithm of the average voltage or power of the diversity input signals.

The output 58 of uniform droop peak detector 52 is coupled through a resistor 138 to the input of an operational amplifier 140 of the level shift/scaling circuit 60. This circuit produces a signal on its output 62 which is proportional to the difference in magnitudes between the signal applied through resistor 138 from the uniform droop peak detector 52 and a signal applied to its other input 142. The signal at input 142 is received from an amplifier 144 driven by a DC signal from power supply VS2 through a potentiometer and resistive network 146. Thus, by changing the setting on the potentiometer 146, the level of the output signal on output 62 can be selectively varied.

The signal produced on output 62 is then applied to the input of the low pass filter 64 which, as seen, comprises an active filter with two amplifiers 148 and 150. A plurality of capacitors and resistors establish the desired frequency characteristic having five poles. The signal produced by the low pass filter 64 is provided at its output 18.

Referring to FIG. 8, an alternative embodiment of the diversity signal strength indicator of the present invention is shown. This embodiment is not preferred presently for it suffers from the disadvantage relative to the preferred embodiment shown in FIG. 1 that the envelope detection must be performed before the log conversion and thus a low cost combined envelope detector/log amplifier such as shown in FIG. 1 cannot be used. In addition, a squaring circuit is required in this embodiment in order for the voltage to be representative of power. Such squaring circuits are usually complex and are presently relatively expensive. The circuit is identical to that described above with reference to FIG. 1 up to the output of amplifier 47. The amplified composite signal from amplifier 47 is applied to the input of an envelope detector 152 which may be of conventional design. The output of the envelope detector is then applied to a squaring circuit 154, and the squared detected composite signal is then applied to a low pass filter 156. Low pass filter 156 may be substantially the same as that shown in FIG. 7b. The output of the low pass filter 156 is applied to a log amplifier 158, and the output of the log amplifier is applied to a level shift/scaling circuit 160, if necessary. It operates, as described above, to produce a signal on its output 162 which is proportional to the logarithm of the average power of the diversity input signals.

Referring to FIG. 9, another embodiment of the diversity signal strength indicator similar to that of the one shwon in FIG. 8 is described. Unlike the prior embodiments, the embodiment of FIG. 9 does not employ time multiplexing to combine the two diversity input signals to produce a composite signal. Instead, each of the diversity input signals A and B are individually operated on in succession by amplifiers 164 and 166, envelope detectors 168 and 170, and squaring circuits 172 and 174 before being applied to a summing circuit 176. The output of the summing circuit 176 is then applied to a suitable log amplifier 178 which, in turn, has its output applied to suitable level shifting circuit 180, if necessary, to produce the signal strength indicator signal on its output 182.

While a number of embodiments have been disclosed, it should be appreciated that this disclosure is for purposes of illustration and the invention is not limited to implementation in the particular manner described. For instance, although a certain order of circuit operations by the level shifting/scaling circuit and low pass filter have been shown that order could be reversed. Also, the level shift/scaling circuit is not always necessary. In addition, although disadvantages may exist between the different embodiments disclosed due to the present level of technology, changes and improvements in this technology may eliminate those disadvantages in the future.

I claim:

1. A diversity signal strength indicator circuit, comprising, in combination:

a pair of terminals for receipt of two separate input diversity signals from two spaced antennas;

means for combining said two separate diversity input signals to produce a composite signal representative of the average amplitude of said two diversity input signals;

means for producing an intermediate log signal which is proportional to a logarithm of said composite signal;

means for detecting a peak magnitude of said intermediate log signal to produce a second intermediate signal proportional to said peak of said intermediate log signal; and means for developing an output DC voltage signal which is proportional to an average magnitude of said second intermediate signal and thus proportional to the average signal strengths of said two input diversity signals.

2. The diversity signal strength indicator circuit of claim 1, in which said combining means comprises means for time multiplexing the two diversity input signals, and said composite signal comprises an alternating series of a magnitude of time segments of said two input diversity signals.

3. The diversity signal strength indicator circuit of claim 2, in which the two spaced antennas comprise the antennas of a diversity radio signal reception site.

4. The diversity signal strength indicator circuit of claim 2, wherein said combining means further comprises a pair of buffer circuits interposed between the pair of antennas and the time multiplexing means to optimize isolation between the antenna and the time multiplexing means.

5. The diversity signal strength indicator circuit of claim 4, including an amplifier for amplifying the time multiplex composite signal prior to application thereof to said intermediate log signal producing means.

6. The diversity signal strength indicator circuit of claims 1 or 2, in which said intermediate log signal producing means includes a log amplifier.

7. The diversity signal strength indicator circuit of claims 1 or 2, in which said intermediate log signal producing means includes an envelope detector.

8. The diversity signal strength indicator circuit of claim 7, in which said intermediate log signal producing means includes a log amplifier.

9. The diversity signal strength indicator circuit of claims 1 or 2, in which said intermediate log signal producing means comprises a combined log amplifier-/envelope detector circuit.

10. The diversity signal strength indicator of claim 1 or 2, further comprising a current-to-voltage converter interposed between said intermediate log signal producing means and said peak detecting means.

11. The diversity signal strength indicator circuit of claims 1 or 2, in which said peak magnitude detecting means includes means for draining the energy in a signal storing means thereof at a rate which is substantially independent of the peak amplitude of the intermediate log signal.

12. The diversity signal strength indicator circuit of claims 1 or 2, in which said DC output signal developing means comprises means for integrating the second intermediate signal.

13. The diversity signal strength indicator circuit of claims 1 or 2, in which said developing means comprises a low pass filter.

14. The diversity signal strength indicator circuit of claim 1, in combination with a low pass filter for filtering the output of said peak detecting means to produce a signal representative of the average strength of said diversity input signals.

15. In a combining diversity radio reception system comprised of a plurality of transceiver sites each of which has a pair of spaced antennas, a site selection system for receiving the diversity input signals received at the two antennas to select an appropriate transceiver site for transmission, said site selection system, comprising:
a diversity signal strength indicator circuit at each site including
a pair of terminals,
means for respectively coupling the pair of antennas to the pair of terminals, and
means responsive to the diversity input signals at said pair of terminals to produce a signal strength output signal which is proporational to the logarithm of an average signal strength of both diversity signals, the signal strength output signal producing means including
means for timing multiplexing the two diversity input signals to produce a composite signal with a strength proportional to the average signal strength of the two diversity input signals, and
means for producing an intermediate log signal proportional to a logarithm of the envelope of the composite signal; and
means for detecting a peak magnitude of said intermediate log signal to produce a second intermediate signal proportional to the peak of said intermediate signal, and
means responsive to said second intermediate signal for developing an output DC voltage signal proportional to said average signal strength of said diversity input signals.

16. The diversity site selection system of claim 15, in which the peak detecting means includes
means for storing the peak levels of the log signal, and
means for reducing the stored levels at a rate substantially independent of the magnitude of the stored levels.

17. The diversity site selection system of claim 16, in which said stored level reducing means includes means for reducing said stored levels at a substantially uniform rate.

18. In a switch or selection diversity radio reception system having a plurality of transceiver sites, each site having at least two antennas, a site selection system for receiving the diversity input signals received at the two antennas to select an appropriate site transceiver for transmission, said site selection system comprising:
a diversity signal strength indicator circuit at each site including
a pair of terminals,
means for respectively coupling the pair of antennas to the pair of terminals, and
means responsive to the diveristy input signals at said pair of terminals to produce an intermediate signal strength output signal which is proportional to a logarithm of an average signal strength of both diversity signals, the signal strength output signal producing means including
means for time multiplexing the two diversity input signals to produce a composite signal with a strength proportional to the average signal strength of the two diversity input signals, and
means for producing a log signal proportional to a logarithm of the envelope of the composite signal; and
means for detecting a peak magnitude of said intermediate log signal to produce a second intermediate signal proporational to the peak of said intermediate log signal, and
means responsive to said second intermediate signal for developing an output DC voltage signal proportional to said average signal strengths of said diversity input signals.

19. The switch or selection diversity radio reception system of claim 18, in which the peak detecting means includes
means for storing the peak levels of the log signal, and
means for reducing the stored levels at a rate substantially independent of the magnitude of the stored level.

20. The switch or selection diversity radio reception system of claim 19 in which said stored level reducing means includes means for reducing said level at a substantially uniform rate.

21. A signal strength indicator circuit, comprising:
means for receiving a pair of diversity input signals;
means for combining the pair of signals on a time multiplexing basis to produce a composite signal;
means for producing an envelope detection signal proportional to the peak magnitude of the composite signal;
means for averaging the envelope detection signal for producing an intermediate signal proportional to the average amplitude of the envelope detection signal; and
means for producing a log signal which is proportional to a logarithm of the average envelope detection signal and thus to a log of the average signal strength of the two diversity input signals.

22. The signal strength indicator circuit of claim 21 in which said averaging means comprises a low pass filter.

23. The signal strength indicator circuit of claim 21 including means for squaring the envelope detection signal to produce a squared envelope detection signal and in which said averaging means produces an intermediate signal proportional to the average of the squared envelope detection signal, and said log signal producing means produces a log signal proportional to a logarithm of the average squared envelope detection signal and thus proportional to a log of the average power of the two diversity input signals.

24. A signal strength indicator circuit, comprising:
means for individually detecting the envelope of first and second input diversity signals to produce a pair of detected signals;
means for individually squaring the envelope detection signals to produce a pair of intermediate signals proportional to the peak amplitude of the input diversity signals,
means for averaging said pair of detected and squared signals; and
means responsive to said averaging means for producing an output signal which is proportional to a logarithm of an average of said pair of detection signals.

25. The signal strength indicator circuit of claim 24, in which the averaging means comprises a summing circuit.

26. A method of determining the signal strength of a pair of diversity input signals comprising the steps of:
combining said two separte diversity input signals to produce a composite signal representative of the average amplitude of the two diversity input signals;
producing an intermediate log signal which is proportional to a logarithm of the composite signal;
detecting a peak magnitude of the intermediate log signal to produce a second intermediate signal proportional to the peak of the intermediate log signal; and
developing an output DC voltage signal which is proportional to an average magnitude of said second intermediate signal and thus proportional to the average signal strengths of said two input diversity signals.

27. The method of claim 26, in which said combining step further comprises the step of:
time multiplexing the two input diversity signals to form an alternating series of a multitude of time segments of said two input diversity signals.

28. The method of claim 26, in which said peak detecting step further comprises the step of:
draining the energy in a signal storing means thereof at a rate which is substantially independent of the peak amplitude of the stored energy.

29. The method of claim 26, in which said output developing step further comprises the step of:
integrating the second intermediate signal.

* * * * *

UNITED STATES PATENT AND TRADEMARK OFFICE
CERTIFICATE OF CORRECTION

PATENT NO. : 4,531,235
DATED : JULY 23, 1985
INVENTOR(S) : BRUSEN, KARL R.

It is certified that error appears in the above-identified patent and that said Letters Patent is hereby corrected as shown below:

Claim 2, line 6, delete "magnitude" and replace therewith --multitude--.

Claim 13, line 2, delete "or 2".

Signed and Sealed this

Fifth Day of November 1985

[SEAL]

Attest:

DONALD J. QUIGG

Attesting Officer

Commissioner of Patents and Trademarks